United States Patent
So et al.

(10) Patent No.: US 7,627,720 B2
(45) Date of Patent: ***Dec. 1, 2009

(54) SYSTEM AND METHOD FOR DIRECTIONAL PREFETCHING

(75) Inventors: Kimming So, Palo Alto, CA (US); Jin Chin Wang, Union City, CA (US)

(73) Assignee: Broadcom Corporation, Irvine, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 11/101,768

(22) Filed: Apr. 8, 2005

(65) Prior Publication Data

US 2005/0182904 A1    Aug. 18, 2005

Related U.S. Application Data

(63) Continuation of application No. 10/294,415, filed on Nov. 14, 2002, now Pat. No. 6,931,494.

(60) Provisional application No. 60/409,256, filed on Sep. 9, 2002, provisional application No. 60/409,240, filed on Sep. 9, 2002, provisional application No. 60/409,361, filed on Sep. 9, 2002.

(51) Int. Cl.
*G06F 12/00* (2006.01)
*G06F 13/00* (2006.01)
*G06F 13/28* (2006.01)

(52) U.S. Cl. ..................................................... 711/137
(58) Field of Classification Search ................. 711/137
See application file for complete search history.

(56) References Cited

U.S. PATENT DOCUMENTS 6,484,239 B1 * 11/2002 Hill et al. ..................... 711/137
6,931,494 B2 *  8/2005 So et al. ....................... 711/137

* cited by examiner

*Primary Examiner*—Sheng-Jen Tsai
(74) *Attorney, Agent, or Firm*—McAndrews, Held & Malloy, Ltd.

(57) ABSTRACT

Systems and methods that provide directional prefetching are provided. In one embodiment, a method may include one or more of the following: storing a first block and a second block in a prefetch buffer; associating a first block access with a backward prefetch scheme; associating a second block access with a forward prefetch scheme; and, if the first block is accessed before the second block, then performing a backward prefetch with respect to the first block.

14 Claims, 7 Drawing Sheets

SYSTEM AND METHOD FOR DIRECTIONAL PREFETCHING

RELATED APPLICATIONS

This application is a continuation of U.S. patent application Ser. No. 10/294,415, entitled "System and Method for Directional Prefetching," filed on Nov. 14, 2002 now U.S. Pat. No. 6,931,494, which claims priority to and claims benefit from: U.S. Provisional Patent Application Ser. No. 60/409,256, entitled "System and Method for Controlling Prefetching" and filed on Sep. 9, 2002; U.S. Provisional Patent Application Ser. No. 60/409,240, entitled "System and Method for Caching" and filed on Sep. 9, 2002; and U.S. Provisional Patent Application Ser. No. 60/409,361, entitled "System and Method for Directional Prefetching" and filed on Sep. 9, 2002.

INCORPORATION BY REFERENCE

The above-referenced United States patent applications are hereby incorporated herein by reference in their entirety.

BACKGROUND OF THE INVENTION

In many fields and applications, a control processor (e.g., central processing unit (CPU)) shares a memory with multiple devices via a memory controller. The CPU may, for example, handle interrupts, manage other functional resources and interact with users. To perform these tasks in a timely manner, the execution speed of the CPU is a substantial factor with respect to the overall system performance. Memory latency, in turn, is a substantial factor with respect to the execution speed. Unlike media processors, for example, that access memory in long data streams, the CPU may tend to access short streams of sequencing addresses. It is difficult to build a shared memory system that satisfies these different types of requests. Thus, the memory latency of the CPU may be long (e.g., tens of cycles) even if the memory bandwidth is high.

One solution to the memory latency problem employs the technique of prefetching. Prefetching may include, for example, loading particular data to storage close to the CPU in anticipation that the CPU may use the data in the near future. The prefetched data is typically saved in the cache of the CPU or a separate prefetch cache. One conventional prefetching scheme is called sequential prefetching which prefetches data close to data that the CPU just used. However, the coverage and accuracy of a particular prefetching scheme can vary with different programs and applications. In addition, the effectiveness of a particular prefetching scheme can even vary with respect to the memory region being accessed by the CPU. In fact, there are some circumstances in which a particular prefetching scheme would be more effective in a forward prefetching scheme (e.g., prefetching memory locations in increasing addresses) and there are some circumstances in which a particular prefetching scheme would be more effective in a backward prefetching scheme (e.g., prefetching memory locations in decreasing addresses). However, conventional prefetching schemes and controls are typically locked into one direction (e.g., a particular forward prefetching scheme) and are unable to adapt in a dynamic environment.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found, for example, in systems and methods that provide directional prefetching. In one embodiment, the present invention may provide a method that provides directional prefetching. The method may include one or more of the following: storing a first block and a second block in a prefetch buffer; associating a first block access with a backward prefetch scheme; associating a second block access with a forward prefetch scheme; and, if the first block is accessed before the second block, then performing a backward prefetch with respect to the first block.

In another embodiment, the present invention may provide a method that provides directional prefetching. The method may include one or more of the following: storing a first block having a tag with a forward bit set to indicate that a forward prefetch be performed if the first block is accessed; and storing a second block having the tag with the forward bit set to indicate that a backward prefetch be performed if the second block is accessed.

In yet another embodiment, the present invention may provide a system that provides directional prefetching. The system may include, for example, a prefetch buffer including a tag array and a data array. The tag array may store a tag that is associated with a block stored in the data array. The tag may include at least one bit that indicates, if the block associated with the tag is accessed, whether to perform a backward prefetch scheme or a forward prefetch scheme.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention may find application and have scope beyond the particular embodiments of systems and methods described herein. For example, although certain embodiments described below may include a prefetch buffer that is separate from the processor, this need not be the case. The prefetch buffer may be part of the cache system of the processor. For example, the prefetch buffer may be part of the processor and may assist or replace an L2 cache of the processor. In fact, the prefetch buffer may be an L2 cache. The present invention also contemplates not including a prefetch buffer in addition to the cache system of the processor. Thus, the present invention may be applicable to existing or adapted cache systems of the processor such as, for example, an L2 cache of the processor. Indeed, the present invention may find application in any system or method that prefetches.

Figure 1:
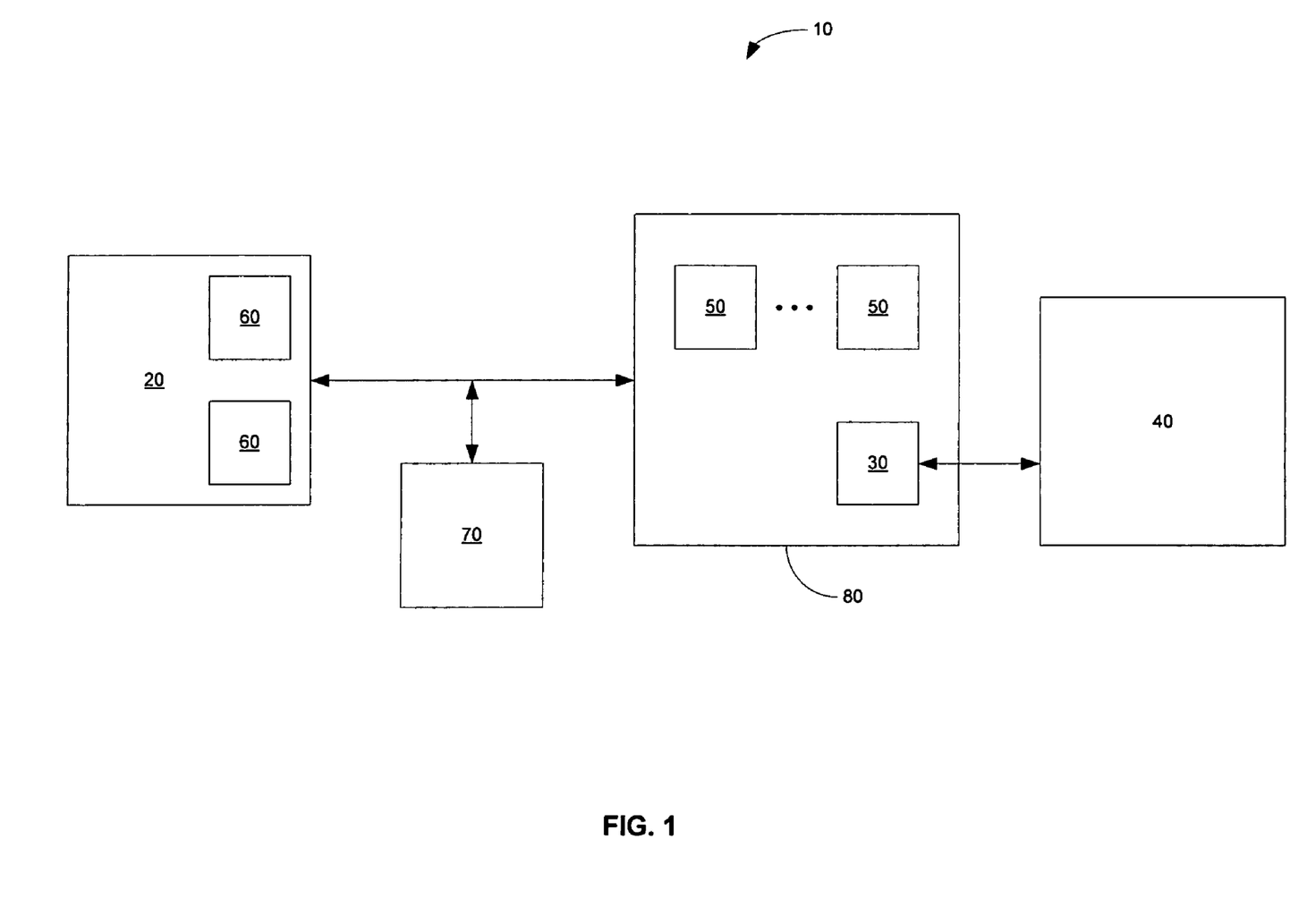
FIG. 1 shows a block diagram illustrating an embodiment of a system that provides directional prefetching according to the present invention.

FIG. 1 shows a block diagram illustrating an embodiment of a system that provides directional prefetching according to the present invention. The system 10 may include, for example, a central processing unit (CPU) 20, a prefetch buffer system 70, a system interconnect and memory controller (SIMC) 80 and a memory 40. The CPU 20 may also include, for example, a cache 60. The cache 60 may include one or more cache, for example, a level one (L1) cache and a level two (L2) cache which may store cache lines. The SIMC 80 may include, for example, a memory controller 30 and other system functional units 50. The memory controller 30 may include, for example, a memory scheduler (not shown). The CPU 20 may be coupled to the SIMC 80 which, in turn, may be coupled to the memory 40 via, for example, the memory controller 30. The prefetch buffer system 70 may be coupled both to the CPU 20 and to the SIMC 80. In one example, the prefetch buffer system 70 may be closer to the CPU 20 than the memory 40 and may be coupled, for example, to a bus, which may couple the CPU 20 to the SIMC 80. However, the prefetch buffer system 70 may be in communications with the CPU 20 and the SIMC 80 using other communication means.

The prefetch buffer system 70 may include, for example, a cache or a buffer. In one embodiment, the prefetch buffer system 70 may not include a buffer, instead prefetched blocks may be stored directly in the cache or caches of the CPU 20. In another embodiment, the prefetch buffer system 70 may include a prefetch buffer (e.g., a spatial cache, a fully functional cache, a buffer, etc.) The prefetch buffer system 70 may also include, for example, a set of controls that may be adapted to prefetch streams of data into the prefetch buffer system 70 to reduce the memory latency of the CPU 20. The set of controls may be adapted to automatically prefetch in a forward direction or in a backward direction.

The prefetch buffer system 70 may be adapted to send one or more kinds of block requests to the memory 40. A block may include a single cache line or a plurality of cache lines. The prefetch buffer system 70 may be adapted to request a missing block from the memory 40 when, for example, a CPU cache line miss (i.e., the CPU 20 was unable to find a particular cache line in its cache 60) also misses the prefetch buffer system 70. The prefetch buffer system 70 may also request a prefetch block from the memory 40 when, for example, a particular block is determined by the prefetch buffer system 70 to be needed by the CPU 20 ahead of the actual need of the CPU 20. A request for a prefetch block may be generated by the prefetch buffer system 70 regardless of whether or not the CPU 20 may find the missing cache line in the prefetch buffer system 70. A request for a particular prefetch block might not be generated if the particular prefetch block already resides in the prefetch buffer system 70.

Figure 2A:
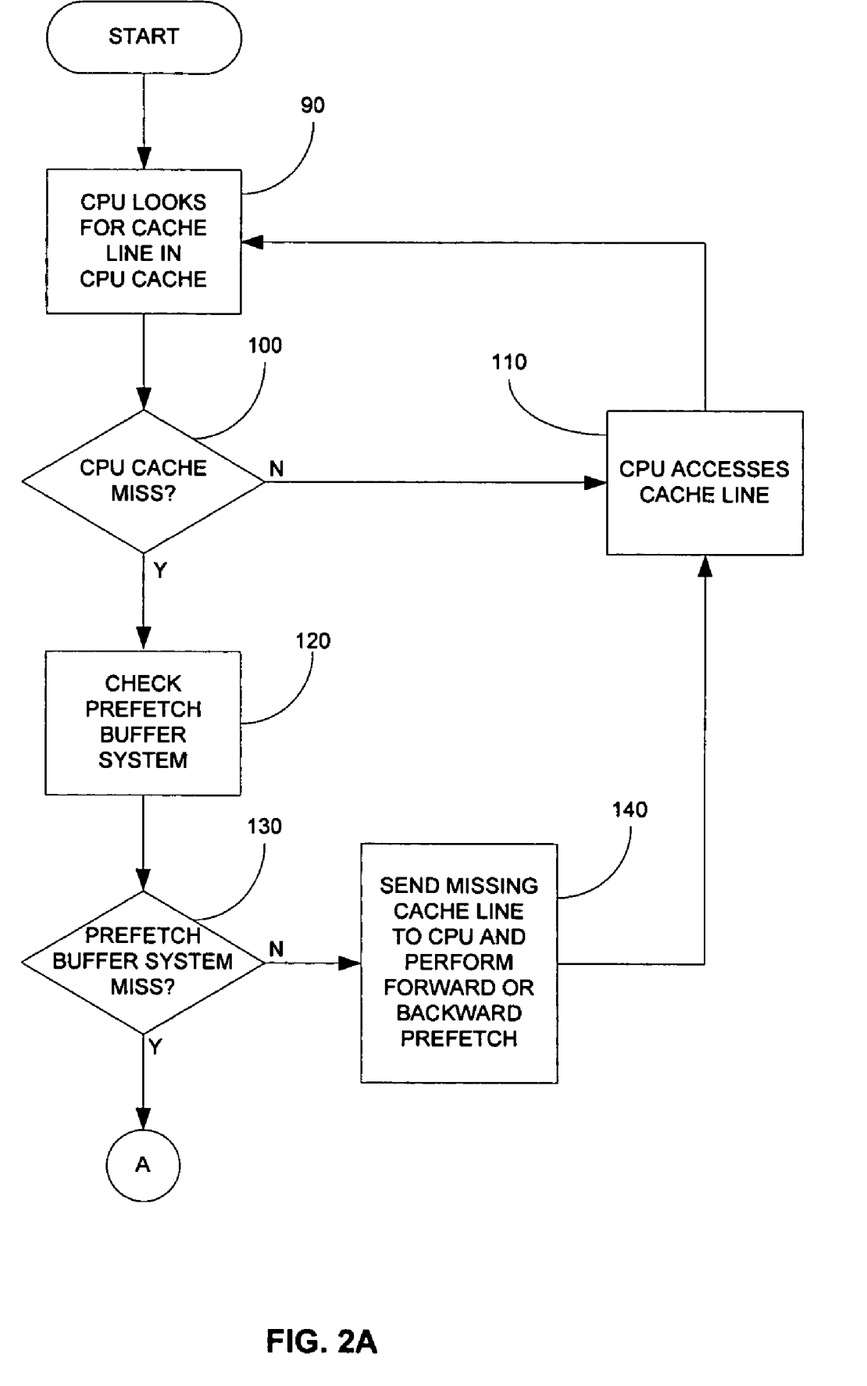
FIGS. 2A-B show a flowchart illustrating an embodiment of a process that provides directional prefetching according to the present invention.
Figure 2B:
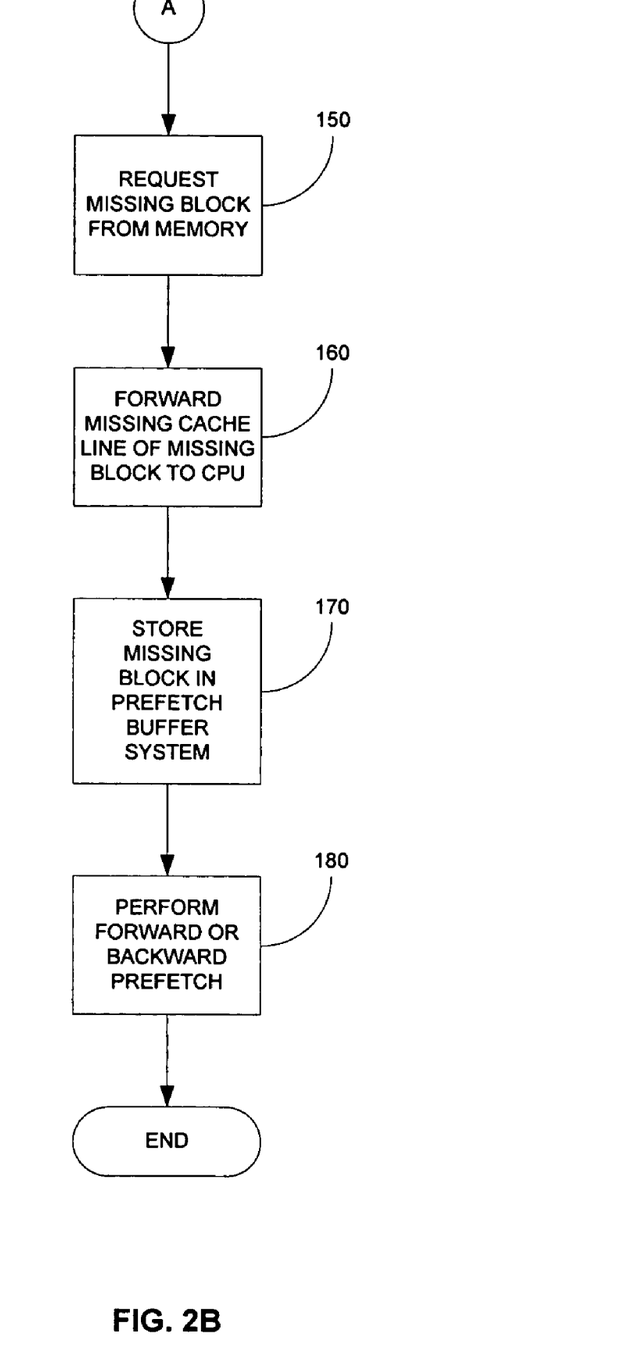

FIGS. 2A-B show a flowchart illustrating an embodiment of a process that provides directional prefetching according to the present invention. In step 90, the CPU 20 may be looking for a particular cache line (e.g., data in a particular cache line) of the CPU cache 60. In query 100, it may be determined whether the particular cache line is presently in the CPU cache 60. If the particular cache line is presently stored in the CPU cache 60 (i.e., if it is not a CPU cache miss), then the CPU may access (e.g., read) the particular cache line in step 110. The process may then, for example, loop back to step 90 in which the CPU 20 may look for a CPU cache line (e.g., another CPU cache line). In query 100, if the particular cache line is not presently stored in the CPU cache 60 (i.e., if it is a CPU cache miss), then, in step 120, the CPU 20 may check the prefetch buffer system 70.

In query 130, it may be determined whether the particular cache line is residing in the prefetch buffer system 70. If the particular cache line is presently stored in the prefetch buffer system 70 (i.e., if it is not a prefetch buffer miss), then, in step 140, the prefetch buffer system 70 may send the particular cache line to the CPU 20 and possibly may perform a forward prefetch or a backward prefetch based on, for example, information relating to the cache line requested by the CPU 20. Whether the prefetch buffer system 70 performs a backward prefetch or a forward prefetch may be determined automatically. In a prefetch, the prefetch buffer system 70 may request a prefetch block or a prefetch cache line from the memory 40 and may store the prefetch block or the prefetch cache line in, for example, a prefetch buffer of the prefetch buffer system 70. The process may, for example, loop back to step 110 in which the CPU 20 may access the cache line received from the memory 40 or the prefetch buffer system 70 and, in step 90, may look for a cache line (e.g., another cache line) in the CPU cache 60. The prefetch request in step 140 need not be received by the memory 40 or be completed before the start of step 110 in the loop back to step 90.

In query 130, if the particular cache line is not presently stored in the prefetch buffer system 70 (i.e., if it is a prefetch buffer miss), then, in step 150, the prefetch buffer system 70 may request a missing block from the memory 40. The requested missing block may include a single cache line (e.g., the particular cache line that was missed) or a plurality of cache lines including the particular cache line that was missed. In one example, in step 160, the prefetch buffer system 70 may receive the requested missing block and may forward the particular cache line of the requested missing block to the CPU 20. In another example, the particular cache line of the requested missing block may be directly forwarded to the CPU 20. In step 170, the prefetch buffer system 70 may store the entire missing block or just the remaining data (e.g., the cache lines other than the particular cache line) of the requested missing block in the prefetch buffer system 70 (e.g., in a prefetch buffer). In step 180, the prefetch buffer system 70 may perform a forward prefetch or a backward prefetch based on, for example, information relating to the cache line requested by the CPU 20 or information relating to the requested missing block. Whether a forward prefetch or a backward prefetch is performed is determined automatically by the prefetch buffer system 70 and may automatically change in a dynamic environment. The prefetch request may include requesting a prefetch block which may include a single cache line or a block request including a plurality of cache lines. In one example, when the prefetch buffer system 70 has generated a missing block request and a prefetch block request, the prefetch buffer system 70 may give priority to the missing block request and send the missing block request before the prefetch block request to the memory controller 30. In one example, the prefetch buffer system 70 may not generate a prefetch block request if the requested prefetch block already resides in the prefetch buffer system 70.

Figure 3:
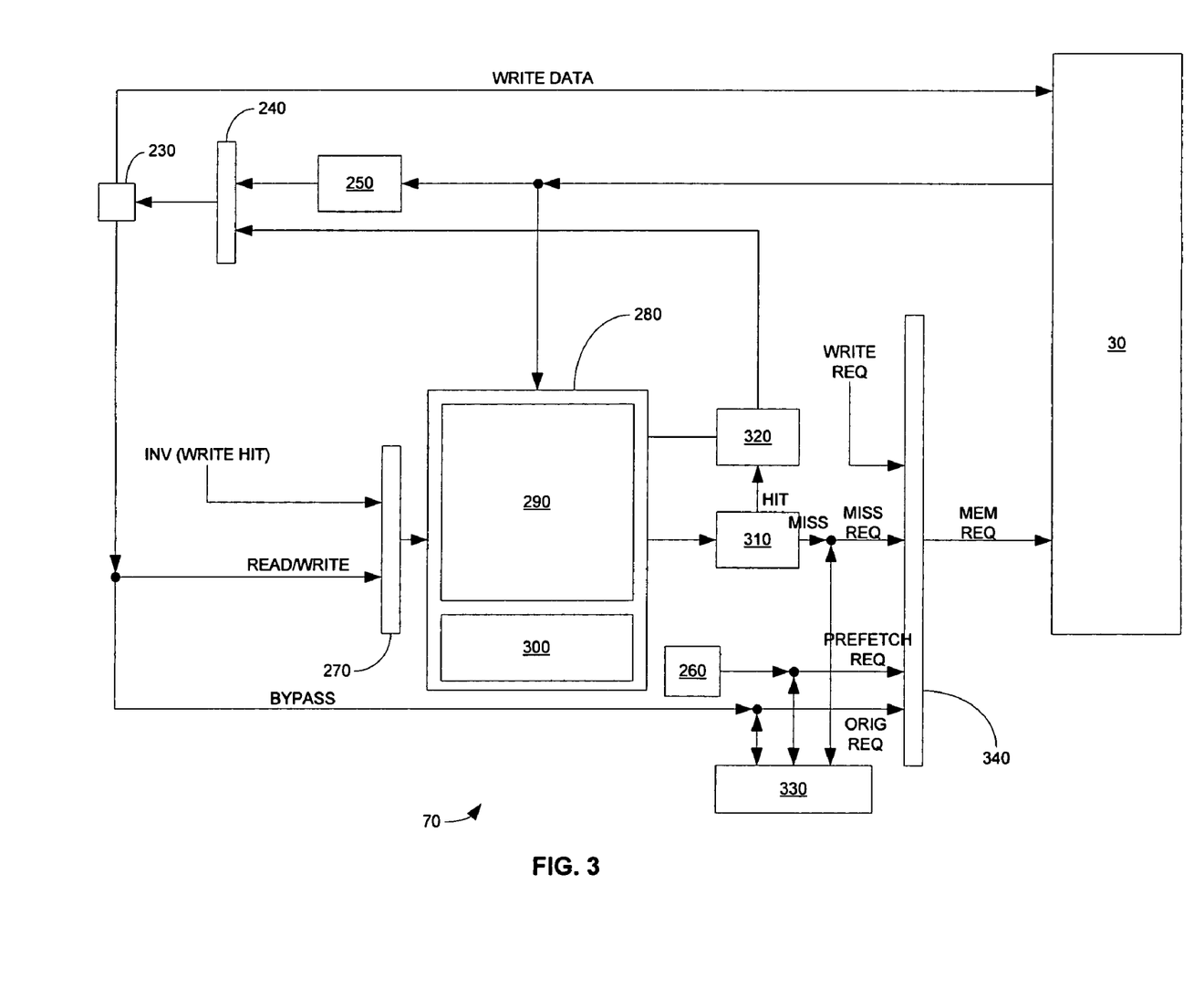
FIG. 3 shows an embodiment of a prefetch buffer system according to the present invention.

FIG. 3 shows an embodiment of a prefetch buffer system 70 according to the present invention. The prefetch buffer system 70 may be coupled, for example, to the memory controller 30 of the SIMC 80. The prefetch buffer system 70 may include, for example, a CPU interface 230, a selector 240, a read buffer 250, a prefetch controller 260, a selector 270, a prefetch buffer 280, a decision block 310, a buffer 320, a request buffer 330 (e.g., a miss request buffer, prefetch request buffer, etc.) and a selector 340. The components may be coupled as illustrated in FIG. 3. However, some couplings have not been illustrated. For example, the CPU interface 230 may be coupled to the CPU 20 or to a bus that is coupled to the CPU 20. The memory controller 30 may be coupled, for example, to the memory 40 and to other functional devices 50.

The prefetch buffer 280 may include, for example, a data array 290 and a directory 300 (e.g., a tag array). The data array 290 may be adapted to store data prefetched from the memory 40. The data array 290 may be arranged into blocks in which each block may store a single cache line or multiple cache lines. In one example, the data array 290 and the directory 300 may be configured as a fully functional cache (e.g., an L2 cache). In another example, the line size of an L1 cache in the CPU 20 may be 32 bytes and the block size of the prefetch buffer 280 may be 128 bytes. Thus, each block of the prefetch buffer 280 may store four cache lines. The directory 300 may be adapted to store the addresses of the data. Each entry in the directory 300 may include, for example, a block address and several valid bits. In one example, each valid bit may correspond to each unit of cache line belonging to the same block. The block may be invalidated if, for example, all of its corresponding valid bits are in an off state. An invalidated block may become a candidate location for refilling prefetched data. Each entry in the directory 300 may also include, for example, one or more bits that indicate whether a forward prefetch or a backward prefetch may be performed if the particular block associated with the respective entry is accessed.

The request buffer 330 may be adapted to store memory requests that are waiting to be sent or that have been sent but not yet completed. The memory requests may include, for example, block address information. The block address information may include, for example, one or more bits that indicate whether a forward prefetch or a backward prefetch may be performed should the block associated with the block address information be accessed. Status bits may be used to indicate, for example, a valid request, a prefetch block request, a missing block request, a request already sent to memory, etc. The request buffer 330 may include, for example, one or more data structures. In one embodiment, the request buffer 330 may include a first data structure (e.g., a queue) that may store missing block requests and a second data structure (e.g., a stack) that may store prefetch block requests. The capacity of the request buffer 330 may be determined, for example, by the maximum number of CPU misses that the prefetch controller may support. A data structure may include one or more last-in-first-out (LIFO) buffers, first-in-first-out (FIFO) buffers or any other type of buffers. The request buffer 330 may also employ a single data structure that may store both missing block requests and prefetch block requests. The request buffer 330 may also be referred to as a block miss buffer.

In operation, a CPU access may cause a look up in the prefetch buffer 280. A CPU read request may be generated in response, for example, to an L1 cache miss or a non-cacheable read. In one example, the CPU cache miss may result in a look up in the prefetch buffer 280. The prefetch buffer system 70 may be adapted such that non-cacheable read requests may be directly provided by the memory 40. In another example, the prefetch buffer 280 may stage non-cacheable data as long as the software can maintain the data coherency among the devices accessing the memory 40.

The look up in the prefetch buffer 280 may be passed from the CPU buffer 230 to the prefetch buffer 280. The prefetch buffer 280, the prefetch controller 260 or the decision block 310 may use address information from the directory 300 in determining whether or not the missing cache line is present in the data array 290. In one embodiment, if the missing cache line is present in the data array 290, then the decision block 310 may determine that it is a prefetch buffer hit and may send the missing cache line to the CPU 20 via the buffer 320, the selector 240 and the CPU interface 230. In another embodiment, once the particular cache line in the data array 290 has been sent to the CPU 20, then the particular cache line in the data array 290 may be invalidated. In one example, invalidation may make the particular cache line stored in the data array 290 inaccessible. In another example, the invalidation may make the space in which the particular cache line resides in the data array 290 a more likely candidate for reuse (e.g., for refill).

In addition to sending the missing CPU cache line to the CPU 20, the prefetch buffer system 70 may also generate a prefetch request in light of information concerning the missing cache line. For example, the prefetch buffer system 70 may check whether or not the next sequential block before or after the block containing the missing cache line resides in the prefetch buffer 280. If it does not, then the prefetch buffer system 70 may generate a prefetch request (e.g., in the prefetch controller 260 or in the request buffer 330) and store it in the request buffer 330. The prefetch request may be, for example, a forward prefetch request or a backward prefetch request. The tag information corresponding to a respective block may include, for example, one or more bits that may determine whether or not a forward prefetch or a backward prefetch may be performed. If a forward prefetch occurs, then the forward prefetch bit configuration may be passed on to subsequent refilled blocks. If a backward prefetch occurs, then the backward prefetch bit configuration of the tag information may be passed on to subsequent refilled blocks. The prefetch request may be transmitted to the memory controller 30 via the selector 340. Priority may be given to missing requests over prefetch requests stored in the request buffer 330.

If the look up in the prefetch buffer 280 shows that the missing cache line is not in the prefetch buffer 280, then a prefetch buffer miss may have occurred. The prefetch buffer system 70 may then generate a missing block request in which the requested missing block may contain the missing CPU cache line. The missing block request may be stored in the request buffer 330 (e.g., in a queue). Since the prefetch buffer system 70 may be able to handle multiple miss requests, a particular missing block request may have to wait for its opportunity in the queue to be transmitted to the memory controller 30 via the selector 340. In addition to the missing block request, the prefetch buffer system 70 may also generate a prefetch block request. The prefetch block request may not be generated if the block requested is already residing in the prefetch buffer 280. The requested prefetch block may be, for example, the next sequential block before or after the block in the missing block request. In one example, the prefetch block may be part of a set of blocks. The memory 40 may be partitioned into sets of blocks. For example, a set of blocks may include block b and block b+1 or block b and block b−1, in which b−1, b and b+1 are block addresses in the memory 40. Thus, the prefetch block request may depend upon which of the blocks in a particular set of blocks is not the missing block. For example, if a set of blocks included block b and block b+1, and the missing block was block b, then the prefetch block request may request block b+1 of the set of blocks. In another example, if a set of blocks included block b and block b−1, and the missing block was block b, then the prefetch request may request block b−1 of the set of blocks.

The prefetch block request may be stored in the request buffer 330 (e.g., in a stack). In one example, the prefetch block request may not be sent to the memory controller 30 until the respective memory block request or any memory block request has been completed.

When the memory controller 30 fetches the requested missing block, the missing cache line may be sent to the CPU 20 via the read buffer 250, the selector 240 and the CPU interface 230. The rest of the data in the requested missing block (e.g., the other cache lines in the missing block) may be refilled into the prefetch buffer 280. In one example, the entire missing block may be stored in the prefetch buffer 280, however, the cache line used by the CPU 20 (which was also sent directly to the CPU 20) may be invalidated. In another example, the entire missing block may be received by the prefetch buffer system 70 before the missing cache line in the missing block is forwarded to the CPU 20. Then, the prefetch buffer system 70 may remove the missing block request from the request buffer 330.

When a prefetched block is received by the prefetch buffer system 70 from the memory 40, the entire prefetched block may be stored in the prefetch buffer 280. Information carried by the prefetch block (or a requested missing block) may be referenced with respect to information stored in the request buffer 330. The respective memory request or an entry associated with the respective memory request may be used to determine where in the prefetch buffer 280 to refill the block of data. For example, the request buffer 330 may include information relating to the least recently used block that may used to refill the block of data. After storing the data, the request buffer entry may be removed.

A CPU write request may also result in a look up request in the prefetch buffer 280. During a write request, a write request and write data may be sent directly to the memory controller 30. However, information about the write request may also be sent to prefetch buffer system 70 which may determine whether or not there is a write hit in the prefetch buffer 280 (i.e., whether the cache line being written to the memory 40 already resides in a block of the prefetch buffer 280). If the cache line resides in the prefetch buffer 280 then, since it may be an older version of the cache line being written to the memory 40, it may be invalidated. The prefetch buffer system 70 may invalidate the cache line or the entire block containing the cache line or even all of the blocks residing in the prefetch buffer 280. If a write miss occurs (i.e., the cache line being written does not reside in the prefetch buffer 280), then the request may be completed. In one embodiment, invalidation is but one option (e.g., programmable option). Other options may include, for example, updating the contents of the line and/or the block stored in the prefetch buffer 280.

Figure 4:
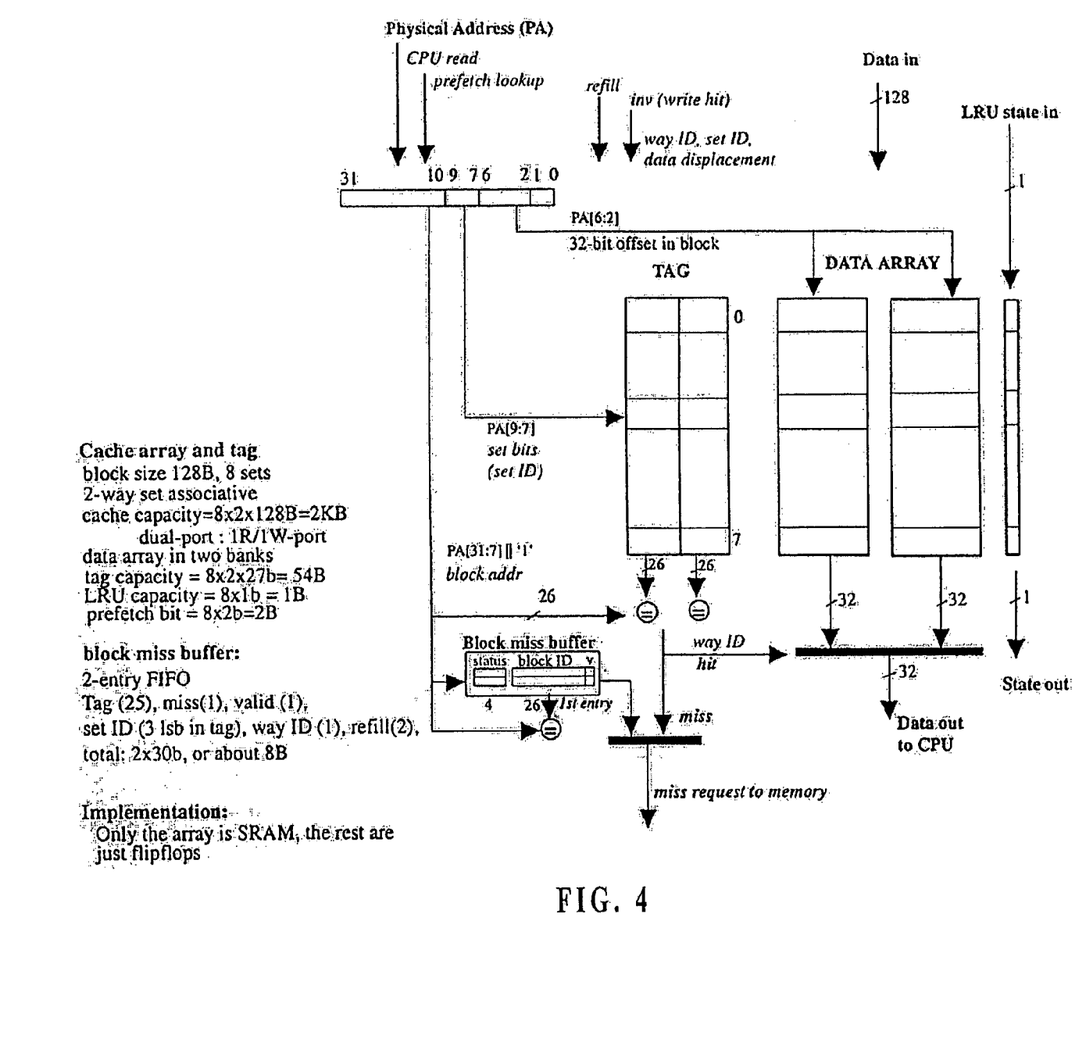
FIG. 4 shows a portion of an embodiment of a prefetch buffer system according to the present invention

FIG. 4 shows a portion of an embodiment of a prefetch buffer system 70 according to the present invention. The prefetch buffer system 70 may be organized in a two-way set associative arrangement and the replacement may be controlled under a least recently used (LRU) replacement algorithm. The prefetch buffer 280 is shown with the tag array 300 and the data array 290 and illustrates an addressing scheme in the prefetch buffer 280. The quantities and numbering schemes are for illustration purposes only. In one embodiment, the arrays 290, 300 may be implemented using static random access memory (SRAM) and the other components may be implemented using one or more types of flip flops. A block may be placed in the prefetch buffer 280 according to particular bits of the set bits, for example, set_ID[9:7] of the access addresses to the block and the LRU bit of the set. When a block is first placed in the prefetch buffer 280, its status may be that of most recently used (MRU). The block that is a candidate for replacement may be the LRU in the set. When all the cache lines in a particular block are sent to the CPU 20, the block may be invalidated and the invalidated block may become the LRU.

Figure 5:
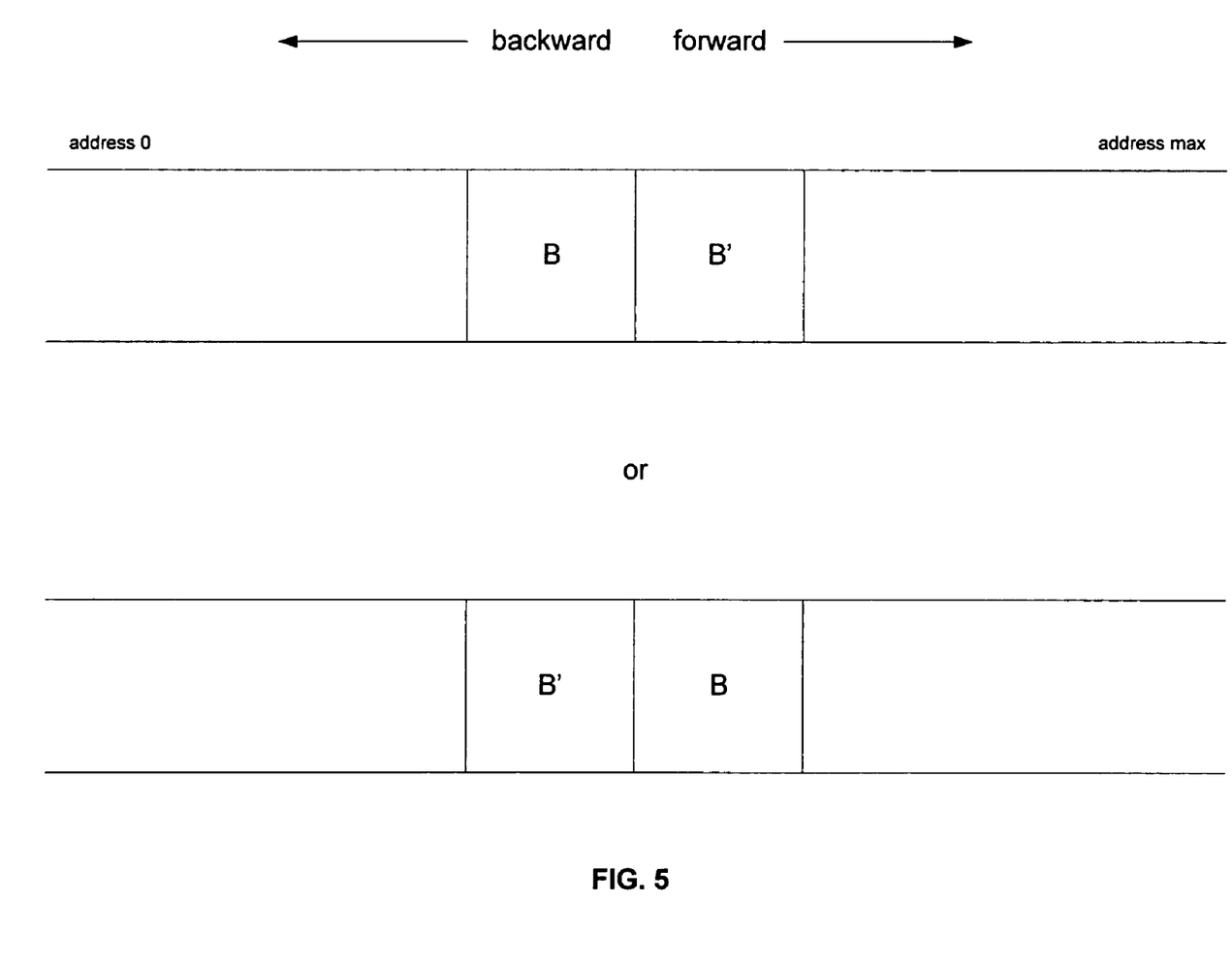
FIG. 5 shows two embodiments of a pair of aligned blocks according to the present invention.

FIG. 5 shows two embodiments of a pair of aligned blocks according to the present invention. The block size may be, for example, 128 bytes. If the address has 32 bits as shown in FIG. 4, then the block identifier (ID) for a block, for example, block B, may include bit 7 to bit 31 of the address. If bit 7 of block B is a 0, then the ID of the other block, for example, block B', in the pair of aligned blocks may have a 1 stored in bit 7 of its ID. This situation is shown in FIG. 5 for the first embodiment (top) in which block B' is shown to the right of block B. If bit 7 of block B is a 1, then the ID of the other block, for example, block B', in the pair of aligned blocks has a 0 stored in bit 7 of its ID. This situation is shown in FIG. 5 for the second embodiment (bottom) in which block B' is shown to the left of block B.

During a miss in the prefetch buffer 280, the prefetch buffer system 70 may request the block missed in the prefetch buffer 280 and may prefetch the other block of a pair of aligned blocks. For example, if blocks B and B' form a pair of aligned blocks, then a missing request for block B may result in a prefetch request for block B'. In another example, a missing request for block B' may result in a prefetch request for block B.

A forward bit may be employed within or in addition to the tag associated with blocks residing in the prefetch buffer 280 or within or in addition to the tag associated with request entries residing in the request buffer 330 (block miss buffer). If a hit occurs in a block residing in the prefetch buffer 280, then the forward bit may be read to determine whether to perform a forward prefetch or a backward prefetch. For example, the forward bit may be a 0, if a backward prefetch should be performed; and the forward bit may be a 1, if a forward prefetch should be performed. Thus, if block B is hit in the prefetch buffer 280 and the forward bit associated with block B stores a 0, then block B−1 may be prefetched (i.e., a backward prefetch may be performed). If block B is hit in the prefetch buffer 280 and the forward bit associated with block B stores a 1, then block B+1 may be prefetched (i.e., a forward prefetch may be performed). Although illustrated with strides of one, the present invention also contemplates using strides of different lengths.

Figure 6:
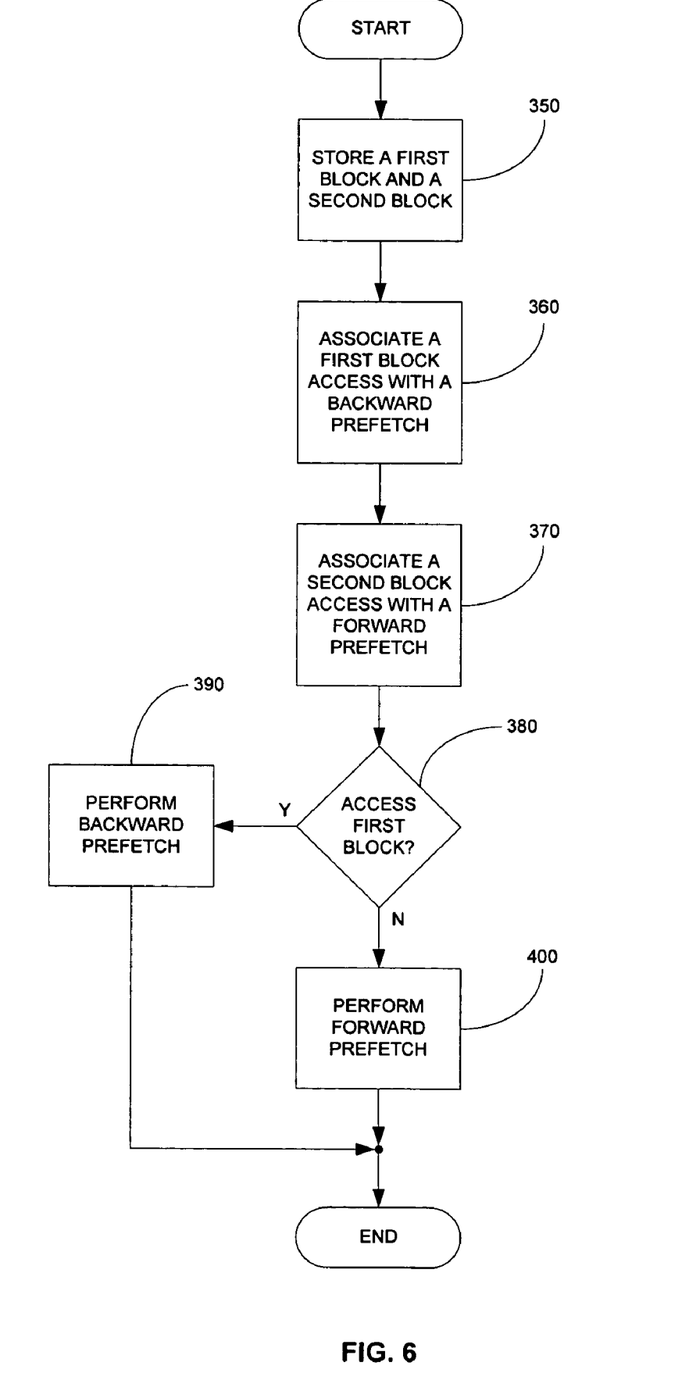
FIG. 6 shows a flowchart illustrating an embodiment of a method that provides directional prefetching according to the present invention.

FIG. 6 shows a flowchart illustrating an embodiment of a method that provides directional prefetching according to the present invention. In step 350, a first block and second block are stored, for example, in the prefetch buffer 280. For ease in explanation, but not to limit the scope of the present invention, assume that the first block has an address block B and the second block has an address block B' and that block B and block B' form a pair of aligned blocks as in the first embodiment (top) shown in FIG. 5. A similar discussion may be made with respect to the second embodiment (bottom) shown in FIG. 5. In one example, after a prefetch buffer miss (e.g., block B is not residing in the prefetch buffer 280), a missing block request may be sent by the prefetch buffer system 70 to the memory controller 30. The missing block request may also be sent to the request buffer 330. Upon receipt of the missing block from the memory 40, the prefetch buffer system 70 may use the missing block request entry (e.g., tag information associated with the missing block request entry) in the request buffer 330 to locate a place in the prefetch buffer 280 in which to store the missing block (e.g., block B). The prefetch buffer system 70 also may generate a prefetch request for the other block (e.g., block B') in the pair of aligned blocks that is not the missing block. The prefetch request may also be stored in the request buffer 330 and, upon receipt of the prefetch block from the memory 40, tag information from the prefetch request may be used to locate a place in the prefetch buffer 280 in which to store the prefetch block (e.g., block B').

In step 360, the first block is associated with a backward prefetch scheme. In step 370, the second block is associated with a forward prefetch scheme. In one example, since block B has the smaller address (i.e., bit 7 of the tag associated with block B stores a 0 and bit 7 of the tag associated with block B' stores a 1) than block B' (e.g., the other block in the pair of aligned blocks), block B is associated with a backward prefetch scheme and block B' is associated with a forward prefetch scheme. Thus, the forward bit associated with block B may be set to 0 (i.e., a backward prefetch scheme) and the forward bit associated with block B' may be set to 1 (i.e., a forward prefetch scheme).

In query 380, it may be determined whether the first access block or the second access block is accessed first. If the first block (e.g., block B) is accessed first, then the forward bit associated with the first block (e.g., block B) may determine whether a forward prefetch or a backward prefetch may be performed. In one example, since block B has a 0 stored in its associated forward bit, then, in step 390, a backward prefetch may be performed. If block B has an address of b, then a prefetch request may be made for a block with an address b−1. The prefetch request may also include tag information such as, for example, the forward bit information of the first block (e.g., block B).

If the first block is not accessed first (e.g., the second block is accessed first), then the forward bit associated with the second block (e.g., block B') may determine whether a forward prefetch or a backward prefetch may be performed. In one example, since block B' has a 1 stored in its associated forward bit, then, in step 400, a forward prefetch may be performed. If block B' has an address of b+1, then a prefetch request may be made for a block with an address b+2. The prefetch request may also include tag information such as, for example, the forward bit information of the second block (e.g., block B').

When the prefetch block is received by the prefetch buffer system 70 from the memory 40, then the prefetch buffer system 70 may use the tag information of the prefetch request stored in the request buffer 330, to determine a location in the prefetch buffer 280 in which to refill the prefetch block. The forward bit information stored in the tag information of the prefetch request may also be stored as forward bit information in the tag information associated with the refilled prefetch block. Thus, the forward bit information may propagate within the tag information associated with the refilled prefetch block.

In one example in which a backward prefetch occurs to prefetch and to refill a block with an address b−1 as described above, the block associated with address b−1 may also have a forward bit set for backward prefetch which was derived from the forward bit information associated with the block associated with address b. Thus, the backward prefetch configuration may propagate within the tag information associated with refilled prefetch block.

In another example in which a forward prefetch occurs to prefetch and to refill a block with an address b+2 as described above, the block associated with address b+2 may also have a forward bit set for forward prefetch which was derived from the forward bit information associated with the block associated with address b+1. Thus, the forward prefetch configuration may propagate within the tag information associated with the refilled prefetch block.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for directional prefetching, the method comprising:
   in response to a prefetch buffer miss:
      prefetching a first block, storing the first block, and associating an access of the first block with a backward prefetch, and
      prefetching a second block, storing the second block, and associating an access of the second block with a forward prefetch scheme; and
   if the first block is accessed before the second block, then performing a backward prefetch with respect to the first block.

2. The method of claim 1, wherein the prefetch buffer miss is a prefetch buffer miss of the first block.

3. The method of claim 1, wherein:
   prefetching the first block comprises generating a first prefetch request for the first block; and
   prefetching the second block comprises generating a second prefetch request for the second block.

4. The method of claim 1, wherein prefetching the first block and prefetching the second block correspond to a same prefetch request.

5. The method of claim 1, wherein:
   prefetching the first block comprises generating a prefetch request for the first block, wherein the prefetch request comprises information regarding where in memory to store the first block; and
   storing the first block comprises determining where to store the first block in memory based, at least in part, on the information regarding where in memory to store the first block.

6. The method of claim 1, wherein the first block and the second block form a pair of aligned blocks.

7. The method of claim 1, wherein performing a backward prefetch with respect to the first block comprises:
   determining the state of a flag corresponding to the first block to determine whether accessing the first block should result in a forward prefetch or a backward prefetch; and
   performing the backward prefetch with respect to the first block based, at least in part, on the determined state of the flag.

8. A system for directional prefetching, the system comprising:
   a memory; and
   at least one module that, in response to a prefetch buffer miss, is adapted to:
      prefetch a first block, store the first block in the memory, and associate an access of the first block with a backward prefetch scheme;
      prefetch a second block, store the second block in the memory, and associate an access of the second block with a forward prefetch scheme; and if the first block is accessed before the second block, then perform a backward prefetch with respect to the first block.

9. The system of claim 8, wherein the prefetch buffer miss is a prefetch buffer miss of the first block.

10. The system of claim 8, wherein the at least one module is further adapted to:
 prefetch the first block by generating a first prefetch request for the first block; and
 prefetch the second block by generating a second prefetch request for the second block.

11. The system of claim 8, wherein the at least one module is further adapted to generate a single prefetch request for both the first block and the second block.

12. The system of claim 8, wherein the at least one module is further adapted to:
 prefetch the first block by generating a prefetch request for the first block, wherein the prefetch request comprises information regarding where in memory to store the first block; and
 store the first block in the memory at a location based, at least in part, on the information regarding where in the memory to store the first block.

13. The system of claim 8, wherein the first block and the second block form a pair of aligned blocks.

14. The system of claim 8, wherein, in performing the backward prefetch with respect to the first block, the at least one module is adapted to:
 determine the state of a flag corresponding to the first block to determine whether accessing the first block should result in a forward prefetch or a backward prefetch; and
 perform the backward prefetch with respect to the first block based, at least in part, on the determined state of the flag.

* * * * *

UNITED STATES PATENT AND TRADEMARK OFFICE
CERTIFICATE OF CORRECTION

PATENT NO. : 7,627,720 B2 Page 1 of 1
APPLICATION NO. : 11/101768
DATED : December 1, 2009
INVENTOR(S) : So et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Second Day of November, 2010

David J. Kappos
*Director of the United States Patent and Trademark Office*